3,422,546
PROCESS OF DRYING FILM
Lloyd W. Crawford, Cookeville, Tenn., assignor to E. I. du Pont de Nemours and Company, Wilmington, Del., a corporation of Delaware
No Drawing. Filed Oct. 19, 1966, Ser. No. 587,654
U.S. Cl. 34—25                                    1 Claim
Int. Cl. F26b 3/02

ABSTRACT OF THE DISCLOSURE

Process of drying polyamide-acid/imide gel film by sensing thickness deviations, then selectively prethickening lanes of inadequate thickness to result in film of improved thickness uniformity.

---

This invention relates to an improvement in the process of drying polyamide-acid/imide gel film in polyimide film production to improve thickness uniformity of the resulting polyimide film.

Polyamide-acid/imide gel films generally are heated to dry them. Notwithstanding careful practice of the drying operation, variations in the transverse direction in the thickness or gauge of the resulting film can occur.

Sources for the problem include variation in the solvent content of individual lanes of the film, variations in the temperature of the film across the casting drum generally used in preparing gel films, and variations which result from nonuniformities in the heating system in the drying section of the production line.

These thickness variations in the transverse direction constitute a major cause for quality rejection of dried polyimide film. Highly uniform gauge of a film is desirable because it results in better uniformity and control of the film properties and performance of products incorporating this film. Furthermore, with uniform gauge or randomized gauge, problems of roll formation are minimized because of the absence of gauge bands.

It is therefore an object of this invention to provide a method for gauge or thickness control of polyimide film. It is another object to provide a method for making a polyimide film having highly uniform gauge. A further object is to provide a method by which it is possible to randomize the gauge of a polyimide film.

These and other objects and advantages are attained in the present invention by a process wherein a polyamide-acid/imide gel film is dried to prepare polyimide film in a continuous manner. In this invention, the gauge or thickness of longitudinal lanes of the resulting polyimide film is measured. Then the heat input is increased to those lanes of the film which are below the desired gauge. This can be accomplished on the gel film in the drying zone or, preferably, in advance of the drying zone. This additional heating selectively thickens those lanes and is accompanied by thinning adjacent lanes, thereby bringing about greater uniformity of thickness in the polyimide film being prepared.

In practicing the invention, polyamide-acid/imide gel film is advanced through a treating zone and the treated film thereafter is rolled to a final package for use or sale. An essential function of the treating zone is to dry the gel film, which normally includes a large percentage of volatiles such as the reaction solvent, as is well known. Accordingly, heat is supplied to the film in the treating zone, as by passing heated air into the zone and into contact with the film. In the treating zone, the gel film is converted to dry, polyimide film.

The thickness of the film as it leaves the treating zone is determined in any manner desired. It can be accomplished manually, but preferably is determined automatically by means well known in the art. Accordingly, a suitable means capable of sensing thickness deviation of longitudinal lanes of the film is located at the exit side of the treating zone. The sensing means can be joined through an automatic controller to a heating system located over the film at a position in advance of the treating zone. The controller converts the deviation signal to a functional signal which directly, or through another controller, selectively operates the heating system in the corresponding lanes in advance of the treating zone. By aligning separate heaters in that heating system for each longitudinal lane of film, individual control of each lane is readily achieved. In operation, when the sensing means indicates a thickness deviation in the film emerging from the treating zone, one or more heaters as needed, over the lane involved, is activated to increase heat input to the thin lane. Such automatic operation usually is accomplished with means that scan the film, a thickness sensing combination and amplification and control circuits, as is known to the art and associated fields.

To accomplish specific longitudinal lane heating in the foregoing fashion for purposes of prethickening certain lanes of the film being processed, a number of different heating systems could be employed. For example, one apparatus which can be employed in the process of this invention is a wide thin air duct, the width being approximately the width of the film at the treating zone or dryer entrance, or a little wider. The duct conducts blown air to the film at a location prior to entry to the dryer. Within the duct is a series of individual heating elements, which can, by way of example, be electric heaters of small width in the transverse direction. Such heaters are individually controlled, and heat narrow lanes of air passing over them, thereby supplying a controlled amount of extra heat to selected lanes of the film. The number of individual heating elements employed will depend on a number of factors including the width of the film and the degree of control which one desires to exercise on the gauge of the film. For a given width, as the number of individual heating elements increases the precision of the gauge control will become better. Control is empirical and can be achieved as follows: where a thin lane is detected in a sample of dried film, heat is supplied to that lane before drying, another gauge trace on dried film is taken, and the appropriate power supply is adjusted as necessary and so on until suitable thickness control is achieved. This same type of control, i.e., monitor-adjust heat input-measure gauge and readjust heat input, is necessary with any heating system used.

The thickness of the duct in the machine direction will depend on factors such as the volume and velocity of air being delivered. The distance of the opening of the duct from the surface of the film also can be varied from well below an inch up to as high as several inches. Although the duct is generally positioned so that it directs the air flow perpendicularly against the surface of the film, the duct can be inclined such that the stream of air is directed against the surface of the film at an angle in the machine direction (as opposed to the transverse direction) of the film.

Alternatively, it is possible to locate a series of long narrow radiant heaters over the film. The radiant heaters are individually controlled so that specific lanes of film can be heated as desired. In another alternative, hot air is employed at constant temperature and at a variable velocity. Air flow to individual lanes of the film is controlled by a set of valves, such as slide valves. In one such apparatus, the valves permitted the air velocity to be varied between 0 and 2500 feet per minute. Of course, the air velocity may vary over wide limits depending upon other variables. The air temperature required will depend in part on many factors including the air velocity, the thickness of the film, and so on. For example, as the air velocity is increased, lower temperatures are permissible. Further, at higher film speeds, higher temperature is required.

The invention is generally operated by heating the thin, longitudinal lanes of film from only one side of the film. However, it is possible to position two devices as described above, one on each side of the film, in order to control the gauge. This may be of advantage when very thick film is being processed, and heat transfer problems require that heat be introduced into both sides of the film.

In drying polyamide-acid/imide gel film, restraint is normally applied to facilitate preparation of good films. Restraint can serve as a means to retain planar dimensions or to stretch film or to permit controlled shrinkage, if desired. In the present invention, the film is restrained during heating operation. This can be accomplished by use of conventional tenter frame equipment, by rolls or, and preferably, by impaling the edges of the film on pins. Pins can be mounted on an endless chain, at each side of the film, the chains being movable in the plane of the film through the heating or drying unit. The spacing of the chains can be varied to permit controlled shrinkage or stretching if desired. Prior to applying restraint, or promptly thereafter, the edges of the gel film generally are heated from one or both of its sides to make them tougher, so that they resist tear out at the edges of the film. This edge preheating can easily be accomplished by directing hot air to those edges through a set of nozzles. Other methods and details of edge heating are disclosed in the copending, coassigned U.S. application of Stanley Tooke, Ser. No. 587,690, filed Oct. 19, 1966, to which reference can be made.

In the heat treating zone, the film is heated to remove volatiles and to complete imidization. A full width heat treatment for this purpose normally involves heating the film at a temperature above about 50° C. for a few seconds to several hours. For many purposes it is advantageous to heat in at least two stages. In a first stage heating at 50° to 250° C. can occur to sharply reduce the solvent content, and in the second stage a higher temperature of 250° to 450° C. or higher, but below the decomposition temperature of the film, can be used to complete removal of volatiles and complete imidization. With a two stage drying system, the film gauge after the second stage would be monitored, and the increased heat input to selected lanes would be accomplished in advance of the first zone, or perhaps in that zone.

The heat necessary for the drying process is provided by hot gasses, any type of electromagnetic radiation, e.g., infrared, microwave (dielectric), etc., or combination of the foregoing. The heating devices may be arranged in two sets so that the film passes between them. Good film results from passing it between two 3-foot sets of strong radiant heaters at rates of about 1 in./min. with a flow of gas such as air to help carry away the solvent. Film speeds of up to 200 yds. per min. or higher can be attained with a dryer of sufficient length. The precise speed chosen will depend on a number of factors, including the gauge of the film, the temperature of the dryer, the air speed in the dryer, etc. For economy in a continuous commercial process, it is important that the drying be carried out rapidly. Hence the heating must be rather vigorous. Particularly suitable are radiant heaters having surface temperatures up to about 1800° C. or higher. The evaporation of solvent from the film can be hastened by passing a gas, such as air, through the heater. Such a gas flow must be adjusted, however, so as to maintain a convection cooling of the heaters and the film at or below an acceptable level.

In a preferred continuous drying operation, a gel polyamide-acid/imide film under restraint and after edge preheating, having a ratio of amide-acid to imide units ranging from 30:70 to 70:30 is introduced into a first heating zone heated by hot air at a temperature of about 250° C. until the volatile content of the film is reduced to below about 15% by weight. The film temperature is in the range of about 110° C. to about 250° C. at the exit from this zone. Residence time in this zone will vary from about 5 seconds to 10 minutes depending upon film thickness, percent solids in the gel film, etc.

The film is then introduced into the second zone where it is heated by radiant heaters having a heater surface temperature of about 1500° C. and positioned about 8 to 9 inches from the film surface. Residence time in this zone will be in the range of about 10 seconds to about 15 minutes and film temperature up to 420° C. are suitable. The resulting final polyimide film contains only a trace of solvent, e.g., 5% to 0.25% or less and no more than 5 to 10% of polyamide acid. Upon exit from the dryer, the film is removed from the restraining means, the edges are trimmed by slitting and the film is rolled up.

The invention is practiced with a polyamide-acid/imide gel film that is to be dried. The term "gel film" is used in its customary sense to mean a thin sheet of the polymeric material which is self-supporting but which is laden with volatiles, primarily solvent, to such an extent that the polymeric material is in a gel-swollen, plasticized, rubbery condition. The gel film thickness generally is in the range of 2 to 400 mils. The volatile content is usually in the range of 40 to 90% by weight and the polymer content usually in the range of 10 to 60% by weight of the gel film.

By the term "polyamide-acid/imide" is meant a polymer consisting essentially of both polyamide-acid and polyimide units in the range of molar ratios of about 5:95 to 95:5. As is known, these are a random type of mixed polymer resulting from partial conversion of a polyamide-acid to polyimide. Gel films high in polyamide-acid content are weaker than those high in polyimide content. Therefore, the present discovery is of particular importance for those films which have an amide-acid/imide ratio above about 30:70.

Polyamide-acid/imide gel films in general can be processed with the present invention. Typical polyamide acids and methods of preparing them for subsequent conversion to polyimides are disclosed in such representative U.S. Patents as: Koerner et al., 3,022,200; Lavin et al., 3,105,775; Smith et al., 3,168,417; Edwards, 3,179,614; Endrey, 3,179,630; Endrey, 3,179,631; Hendrix, 3,179,632; Endrey, 3,179,633; Edwards, 3,179,634; Frost et al., 3,179,635; and French Patent No. 1,386,617, dated Jan. 21, 1964. Copolymers and mixtures of polymers can likewise be employed, such as are disclosed in pending U.S. applications as: Gall, Ser. No. 331,353, filed Dec. 18, 1963, now U.S. Patent 3,264,250; Angelo, Ser. No. 398,784, filed Sept. 23, 1964; Abramo, Ser. No. 417,242, filed Dec. 9, 1964, now U.S. Patent 3,342,897; and Taylor, Ser. No. 427,160, filed Jan. 21, 1965. The preferred embodiments are those directed to wholly aromatic polyimides. Films that are loaded with other materials, such as carbon, abrasives, dielectrics and fluoropolymer particles can as well be processed. Such films are disclosed in the applications of Berr et al., Ser. No. 187,451, filed Apr. 10, 1962, now abandoned, Gerow, Ser. No. 245,665, filed Dec. 19, 1962, now U.S. Patent 3,295,940, Edwards, Ser. No. 249,127, filed Jan. 3, 1963, now U.S. Patent 3,287,311, Matray, Ser. No. 368,361, filed May 18, 1964, now U.S. Patent 3,356,760, and Gerow, Ser. No. 245,652, filed Dec. 19, 1962, now U.S. Patent 3,356,759. In addition the process can be practiced with solvent containing films made from solutions of polyimides, such as disclosed in Rogers Ser. No. 335,383, filed Jan. 2, 1964, now U.S. Patent 3,356,648. The disclosures of the foregoing patents and applications are incorporated herein by reference. In typical practice, the organic diamine and tetracarboxylic acid dianhydride are reacted in a solvent to make the polyamide-acid which is then shaped into a film, followed by partial conversion to polyamide-acid/imide. Where heating is applied for purposes of conversion to the gel film, a typical temperature used is about 70° to 130° C. The gel film stage is that stage at which the film becomes self-supporting so that it can be stripped from the support on which it was cast.

The solvent content at which a given polymer will form a gel film depends to some extent on the amide-acid/imide ratio of the polymer and its molecular weight. As the imide content and molecular weight of the polymer increase, a gel film will form at higher solvent content. For example, for a typical polymer having an inherent viscosity of 1.0 or higher, a 15% solids composition becomes a self-supporting gel film when about 40 to 50% of the polymer units have been cyclized to imide units. At higher solids content, compositions become self-supporting gel films at lower imide content, and vice versa.

Polyamide-acid/imide films in the self-supporting gel state are solvent laden. The reaction solvent serves as the swelling and plasticizing agent and constitutes the major amount of the volatiles. If desired, some or all of the solvent or other volatiles can be replaced by a conventional plasticizer as diethyl phthalate by soaking the gel film in the plasticizer. These films may also contain fillers, pigments, plasticizers, dyes and like additives. Other typical volatiles that may be present are disclosed in the copending application of Berr and Tink, Ser. No. 444,382, filed Mar. 31, 1965, which is incorporated herein by reference.

The films resulting in this invention are useful as such or their utility can be enhanced by any of a large number of coatings, surface treatments, incorporation into laminated structures with one or more layers of similar or different materials. All such uses are well known in the art, to which reference can be made for details.

The invention will be described further in conjunction with the following examples in which the details are given by way of illustration.

EXAMPLE I

A solution of the polyamide-acid derived from pyromellitic dianhydride and bis(4-aminophenyl)ether in N,N-dimethylacetamide solution was being continuously cast and dried at elevated temperature in a film dryer to produce a nominal 1-mil film of the polypyromellitimide of bis(4-aminophenyl)ether. The gauge profile of the resulting film was taken and the film was found to vary from about 0.9 mil to about 1.1 mils across its 18 inch width. One thin portion of the film occurred within the range of 6 to 8 inches from the reference edge of the film sheet.

A heat gun designed to draw 14 amperes at 115 volts was supplied with power controlled by a powerstat. The exit nozzle of the heat gun was directed almost parallel to, and in the direction of travel of, the gel polyamide-acid/imide film at the entrance to the film dryer so that a heated lane of air would travel along the film. Other conditions of dryer operation were not changed. The lane of film heated had its center at 7 inches from the reference edge of the film. Power was supplied at 300 watts, then 900 watts, and finally 1500 watts, to this lane and each level was maintained sufficiently long for the heated lane to pass through the dryer, whereupon the gauge of the film was again taken. A plurality of gauge measurements in each lane were taken at each power level. It was found that the 6 to 8 inch lane was but slightly influenced by heat from power at 300 watts. At 900 watts, that lane developed a thickness of about 1.1 mils and at 1500 watts its thickness exceeded 1.2 mils.

This practice confirmed the effectiveness of the process to thicken selectively lanes of the film thereby to improve thickness control. The data show that the amount of thickening is dependent upon the amount of power supplied, and therefore heat input. In a control experiment an unheated (room temperature) jet of air had no observable effect on the gauge of the film.

EXAMPLE II

A solution of the polyamide-acid derived from pyromellitic dianhydride and bis(4-aminophenyl)ether was being cast and dried, as in Example I, to a nominal 1-mil film of the corresponding polyimide. The gauge profile of the resulting film was taken, and the gauge variation was found to be about 25%.

To improve the gauge of the film, a nozzle or duct device containing 17 individual heaters was used. Each heater was a 450 watt/115 volt Nichrome wire coil, wound through holes in a transite insulating strip such that the distance between centers of adjacent heaters was 1%16 inches. Each heater was individually controlled with a powerstat. Air issued from a distribution chamber through a perforated plate into the nozzle channel, flowed over the heaters and out the lips, impinging upon the sheet of gel film just as it passed into the dryer.

The duct containing the heaters was arranged over the film in such a fashion that heater No. 5 was over the film lane 16 inches from the reference edge, heater No. 9 was at about 9 inches, and heater No. 14 was at about ½ inch. Heater No. 15 was beyond the reference edge, while Nos. 1 to 4 were beyond the other edge.

With the drying line operating, heater No. 11 (at about 5¾ inches from the reference edge) was powered with 450 watts. A profile of the film being produced showed a thickening of the film there. Then heater Nos. 8, 9, 11 and 13 were turned on to 300 watts. The film gauge generally improved. Next, the power to No. 9 was reduced to 225 watts and No. 14 was turned on, since the lane at heater No. 9 was now to thick and the reference edge was too thin (0.9 mil). After another profile analysis, No. 14 was turned off and No. 15 turned on at 300 watts. Then, after profile study, No. 9 was reduced to 175 watts, Nos. 11 and 13 remained at 300 watts, and Nos. 8 and 15 were increased to 350 watts. Again a gauge profile was taken and the variation over the 16 inch width was now found to be but 10 percent.

While this example was manually controlled, it is apparent that similar results could be achieved automatically. Obviously, even further improvement could be attained with further adjustment of selective heat input.

EXAMPLE III

A polyamide-acid solution was cast and dried, continuously, to produce a polyimide film based on pyromellitic dianhydride and bis(4-aminophenyl)ether. In this case the nominal thickness of the dry film was 5 mils, and the gauge profile of the resulting film was taken. Heating apparatus as described in Example II was used for lane heating; however only the heater at 8 inches from the reference edge was turned on in order to demonstrate the effect on a thick film. Power of 250 watts in that specific lane brought about material thickening of the lane, thereby showing effectiveness for thicker films.

In further demonstrations of the discovery, decreased thickness variation in thick, loaded film as described in the U.S. patent application to Matray, Ser. No. 368,361, filed May 18, 1964, now U.S. Patent 3,356,760, was demonstrated. Specifically, 32 percent variation was reduced to about a 15 percent variation upon heating only the three thinnest lanes with heater power of 200 watts.

From the foregoing discussion and description, it is evident that this invention is a significant improvement in producing polyimide film of better gauge uniformity. While the invention has been described in certain detail, it will be appreciated that changes therefrom can be made without departing from its scope.

What is claimed is:

1. In a process in which a polyamide-acid/imide gel film is placed under restraint and while so restrained is continuously passed through a heating zone where it is subjected across its width to elevated temperature to at least dry the film to produce a dry, polyimide film of predetermined thickness, the steps of determining deviations from the predetermined thickness in longitudinal lanes of the polyimide film after it has passed out of the heating zone, and preferentially heating at a location in advance of entry to the zone longiudinal lanes of the gel film having inadequate thickness to pre-thicken those lanes and result in film of more uniform thickness.

References Cited

UNITED STATES PATENTS

| | | | |
|---|---|---|---|
| 3,153,683 | 10/1964 | Bryan et al. | 264—80 |
| 3,161,482 | 12/1964 | Gschwind et al. | 34—25 XR |
| 3,179,614 | 4/1965 | Edwards | 264—80 XR |
| 3,316,654 | 5/1967 | Gay | 34—23 |
| 3,359,643 | 12/1967 | Leibelt et al. | 34—25 |

KENNETH W. SPRAGUE, *Primary Examiner.*